US008989366B1

(12) United States Patent
Moore et al.

(10) Patent No.: US 8,989,366 B1
(45) Date of Patent: *Mar. 24, 2015

(54) SYSTEM AND METHOD FOR MANAGING CUSTOMER COMMUNICATIONS OVER COMMUNICATION CHANNELS

(71) Applicant: JPMorgan Chase Bank, N. A., New York, NY (US)

(72) Inventors: Robert Moore, Hockessin (DE); Brian Lawhorne, Columbus, OH (US)

(73) Assignee: JPMorgan Chase Bank, N.A., New York, NY (US)

(*) Notice: Subject to any disclaimer, the term of this patent is extended or adjusted under 35 U.S.C. 154(b) by 264 days.

This patent is subject to a terminal disclaimer.

(21) Appl. No.: 13/712,248

(22) Filed: Dec. 12, 2012

Related U.S. Application Data

(63) Continuation of application No. 12/839,693, filed on Jul. 20, 2010, now Pat. No. 8,358,771.

(60) Provisional application No. 61/317,091, filed on Mar. 24, 2010.

(51) Int. Cl.
*H04M 5/00* (2006.01)
*H04M 3/51* (2006.01)

(52) U.S. Cl.
CPC .................................. *H04M 3/5191* (2013.01)
USPC ............ 379/265.01; 379/265.09; 379/266.02; 379/266.03; 379/266.07; 379/274

(58) Field of Classification Search
USPC .............................. 379/201.04, 265.01–266.1
See application file for complete search history.

(56) References Cited

U.S. PATENT DOCUMENTS

| | | | |
|---|---|---|---|
| 4,797,911 A | 1/1989 | Szlam et al. |
| 4,939,773 A | 7/1990 | Katz |
| 4,975,841 A | 12/1990 | Kehnemuyi et al. |
| 4,987,590 A | 1/1991 | Katz |
| 5,025,373 A | 6/1991 | Keyser, Jr. et al. |
| 5,050,207 A | 9/1991 | Hitchcock |
| 5,091,933 A | 2/1992 | Katz |
| 5,122,950 A | 6/1992 | Benton et al. |
| 5,157,717 A | 10/1992 | Hitchcock |
| 5,185,787 A | 2/1993 | Katz |
| 5,224,153 A | 6/1993 | Katz |
| 5,231,571 A | 7/1993 | D'Agostino |

(Continued)

OTHER PUBLICATIONS

The Customer Interaction Specialists, Computer Telephony Systems, May 25, 1999.

(Continued)

*Primary Examiner* — Joseph J Nguyen
(74) *Attorney, Agent, or Firm* — Hunton & Williams LLP (57) ABSTRACT

A system and method for managing customer communications over communication channels are disclosed. A method may include (1) at least one of a plurality of computer processors determining a communication channel for contacting a customer; (2) at least one of the plurality of computer processors determining contact information for the customer to be used with the determined communication channel; (3) presenting the contact information to an agent; (4) receiving, at an electronic device, authorization to initiate contact with the customer using the contact information; and (5) at least one of a plurality of computer processors automatically initiating contact with the customer using the communication channel.

25 Claims, 2 Drawing Sheets

(56) References Cited

U.S. PATENT DOCUMENTS

| | | |
|---|---|---|
| 5,233,654 A | 8/1993 | Harvey et al. |
| 5,262,860 A | 11/1993 | Fitzpatrick et al. |
| 5,265,008 A | 11/1993 | Benton |
| 5,297,197 A | 3/1994 | Katz |
| 5,309,505 A | 5/1994 | Szlam et al. |
| 5,359,645 A | 10/1994 | Katz |
| 5,381,470 A | 1/1995 | Cambray et al. |
| 5,412,708 A | 5/1995 | Katz |
| 5,420,405 A | 5/1995 | Chasek |
| 5,436,965 A | 7/1995 | Grossman et al. |
| 5,442,688 A | 8/1995 | Katz |
| 5,467,391 A | 11/1995 | Donaghue, Jr. et al. |
| 5,475,743 A | 12/1995 | Nixon et al. |
| 5,485,370 A | 1/1996 | Moss et al. |
| 5,495,284 A | 2/1996 | Katz |
| 5,511,112 A | 4/1996 | Szlam |
| 5,583,933 A | 12/1996 | Mark |
| 5,590,196 A | 12/1996 | Moreau |
| 5,594,791 A | 1/1997 | Szlam |
| 5,606,496 A | 2/1997 | D'Agostino |
| 5,671,267 A | 9/1997 | August et al. |
| 5,675,637 A | 10/1997 | Szlam et al. |
| 5,729,594 A | 3/1998 | Klingman |
| 5,745,555 A | 4/1998 | Mark |
| 5,761,288 A | 6/1998 | Pinard et al. |
| 5,784,452 A | 7/1998 | Carney |
| 5,790,650 A | 8/1998 | Dunn et al. |
| 5,793,861 A | 8/1998 | Haigh |
| 5,825,856 A | 10/1998 | Porter et al. |
| 5,825,870 A | 10/1998 | Miloslavsky |
| 5,825,871 A | 10/1998 | Mark |
| 5,870,724 A | 2/1999 | Lawlor et al. |
| 5,963,635 A | 10/1999 | Szlam et al. |
| 5,995,948 A | 11/1999 | Whitford et al. |
| 6,014,439 A | 1/2000 | Walker et al. |
| 6,092,192 A | 7/2000 | Kanevsky et al. |
| 6,134,530 A | 10/2000 | Bunting et al. |
| 6,170,011 B1 | 1/2001 | Macleod Beck et al. |
| 6,173,316 B1 | 1/2001 | De Boor et al. |
| 6,202,054 B1 | 3/2001 | Lawlor et al. |
| 6,253,327 B1 | 6/2001 | Zhang et al. |
| 6,330,327 B1 | 12/2001 | Lee et al. |
| 6,349,290 B1 | 2/2002 | Horowitz et al. |
| 6,804,346 B1 | 10/2004 | Mewhinney |
| 7,066,382 B2 | 6/2006 | Kaplan |
| 7,076,458 B2 | 7/2006 | Lawlor et al. |
| 7,496,950 B2 | 2/2009 | Carley |
| 7,580,890 B2 | 8/2009 | Siegel et al. |
| 7,693,790 B2 | 4/2010 | Lawlor et al. |
| 2001/0001856 A1 | 5/2001 | Gould et al. |
| 2001/0038033 A1 | 11/2001 | Habib |
| 2002/0059139 A1 | 5/2002 | Evans |
| 2002/0064149 A1 | 5/2002 | Elliott et al. |
| 2002/0069104 A1 | 6/2002 | Beach et al. |
| 2002/0186828 A1* | 12/2002 | Bushnell ............... 379/211.02 |
| 2003/0009401 A1 | 1/2003 | Ellis |
| 2003/0069780 A1 | 4/2003 | Hailwood et al. |
| 2005/0091156 A1 | 4/2005 | Hailwood et al. |
| 2006/0085331 A1 | 4/2006 | Imrey et al. |
| 2006/0085332 A1 | 4/2006 | Imrey et al. |
| 2006/0095956 A1* | 5/2006 | Ashley et al. .................. 726/4 |
| 2006/0291580 A1* | 12/2006 | Horvitz ........................ 375/265 |
| 2009/0040968 A1* | 2/2009 | Kusnitz et al. ............... 370/328 |
| 2009/0285377 A1* | 11/2009 | Sennett et al. ........... 379/201.04 |
| 2011/0116618 A1* | 5/2011 | Zyarko et al. ............ 379/266.07 |

OTHER PUBLICATIONS

CSU/DSU (Channel Service Unit/Data Service Unit), CTI (Computer-Telephony Integration), pp. 208-210 (date unknown).

Credit Card Management, Astrid Rial, Faulkner & Gray, Inc., New York: Jul. 2000. vol. 13, Iss. 4; p. 65, 4 pgs.

Telecommunications Demand Analysis in Transition, Lester D. Taylor, Dept. of Economics, University of Arizona, proc. 31st Annual Hawaii, International Conference on System Sciences, 1988.

* cited by examiner

SYSTEM AND METHOD FOR MANAGING CUSTOMER COMMUNICATIONS OVER COMMUNICATION CHANNELS

CROSS-REFERENCE TO RELATED APPLICATIONS

This application is a continuation of U.S. patent application Ser. No. 12/839,693, filed Jul. 20, 2010, and claims priority to U.S. Provisional Patent Application Ser. No. 61/317,091, filed Mar. 24, 2010. The disclosures of both are hereby incorporated, by reference, in their entireties.

BACKGROUND OF THE INVENTION

1. Field of the Invention

The present invention generally relates to systems and methods for managing customer communications over communication channels.

2. Description of the Related Art

Companies, marketing services, debt collection agencies, etc. often employ the services of auto-dialers in order to market new products to current and potential customers. There are generally two modes of using auto-dialers: "predictive" mode and "preview" mode. In predictive mode, the dialer attempts to predict the probability a customer will answer the phone in order to maximize the number of outbound call attempts made in any given period. To do this, the dialer automatically calls several numbers in advance and transfers calls to agents only when a "live" person answers the call. This type of dialing eliminates busy signals, answering machines, etc. and minimizes agent downtime.

In preview mode, however, the dialer displays contact information to an agent before placing the call. The agent is given control over the system and can decide when a call is to be placed to a recipient. If a person answers, the agent is linked to the customer immediately.

SUMMARY OF THE INVENTION

A system and method for managing customer communications over communication channels are disclosed. In one embodiment, a method includes (1) determining a contact mode for contacting a customer based on at least one of a campaign strategy, a customer account attribute, a phone number attribute, a previous contact outcome, a previous call outcome, an email address attribute, a time of day, a customer contact preference, a customer availability, and a customer contact consent; (2) initiating contact with the customer; and (3) interacting with the customer.

In one embodiment, determining a contact mode may include determining a communication channel on which to contact the customer. The communication channel may include a telephone, a cellular phone, an email, a text message, a chat, a facsimile, and a social networking site.

In one embodiment, the customer availability may be determined based on a location of the customer.

The method may further include determining a dialing mode. In one embodiment, the dialing mode may be a predictive mode, a preview mode, a preview manual mode, manual mode, and preview manual mode. The dialing mode may be determined based on a campaign strategy, account attributes, phone number attributes, previous call outcomes, customer preferences, a customer availability, and/or customer contact consent.

The method may further include determining an alternate communication channel by which to contact the customer; and initiating contact with the customer on the alternate communication channel. The alternate communication channel may be determined based on one of a customer feedback, a customer location, and a customer preference.

According to another embodiment, a method for managing customer communications over a plurality of communication channels includes (1) using a campaign manager, selecting a dialing mode for contacting a customer based on at least one of a campaign strategy, a customer account attribute, a phone number attribute, a previous contact outcome, a previous call outcome, a time of day, a customer contact preference, a customer availability, and a customer contact consent, wherein the dialing mode is one of predictive mode, preview mode, preview manual mode; (2) attempting to contact the customer using the selected dialing mode; (3) determining an alternate dialing mode based on the result of the attempted contact; and (4) attempting to contact the customer using the alternate dialing mode.

The method may further record a result of the attempted contact using the selected dialing mode a result of the attempted contact using the alternate dialing mode.

The method may also revert to a default dialing mode following the attempted contact using the alternate dialing mode.

According to another embodiment, a system for managing customer communications over a plurality of communication channels may include a database comprising contact data including at least one of a campaign strategy, a customer account attribute, a phone number attribute, a previous contact outcome, a previous call outcome, a customer contact preference, a customer availability, and a customer contact consent; a computer processor executing a communication manager, the communication manger determining a contact mode for contacting a customer on a communication channel selected from the group consisting of a telephone, a cellular phone, an email, a text message, a chat, a facsimile, and a social networking site. The communication manager may select a communication channel based on the contact data; and the contact system may contact the customer using the selected communication channel.

The communication manager may include a rules engine that determines a criteria for switching a contact mode. The communication manager may also determine a dialing mode for a telephone and a cellular phone communication channel. The communication manger may further determine an alternate communication channel by which to contact the customer.

The dialing mode is may be one of a predictive mode, a preview mode, a preview manual mode, and a manual mode. The dialing mode may be determined based on at least one of a campaign strategy, an account attribute, a phone number attribute, a previous call outcome, a customer preference, a customer availability, and a customer contact consent.

BRIEF DESCRIPTION OF THE DRAWINGS

For a more complete understanding of the present invention, the objects and advantages thereof, reference is now made to the following descriptions taken in connection with the accompanying drawings in which.

DESCRIPTION OF PREFERRED EMBODIMENTS

Figure 1:
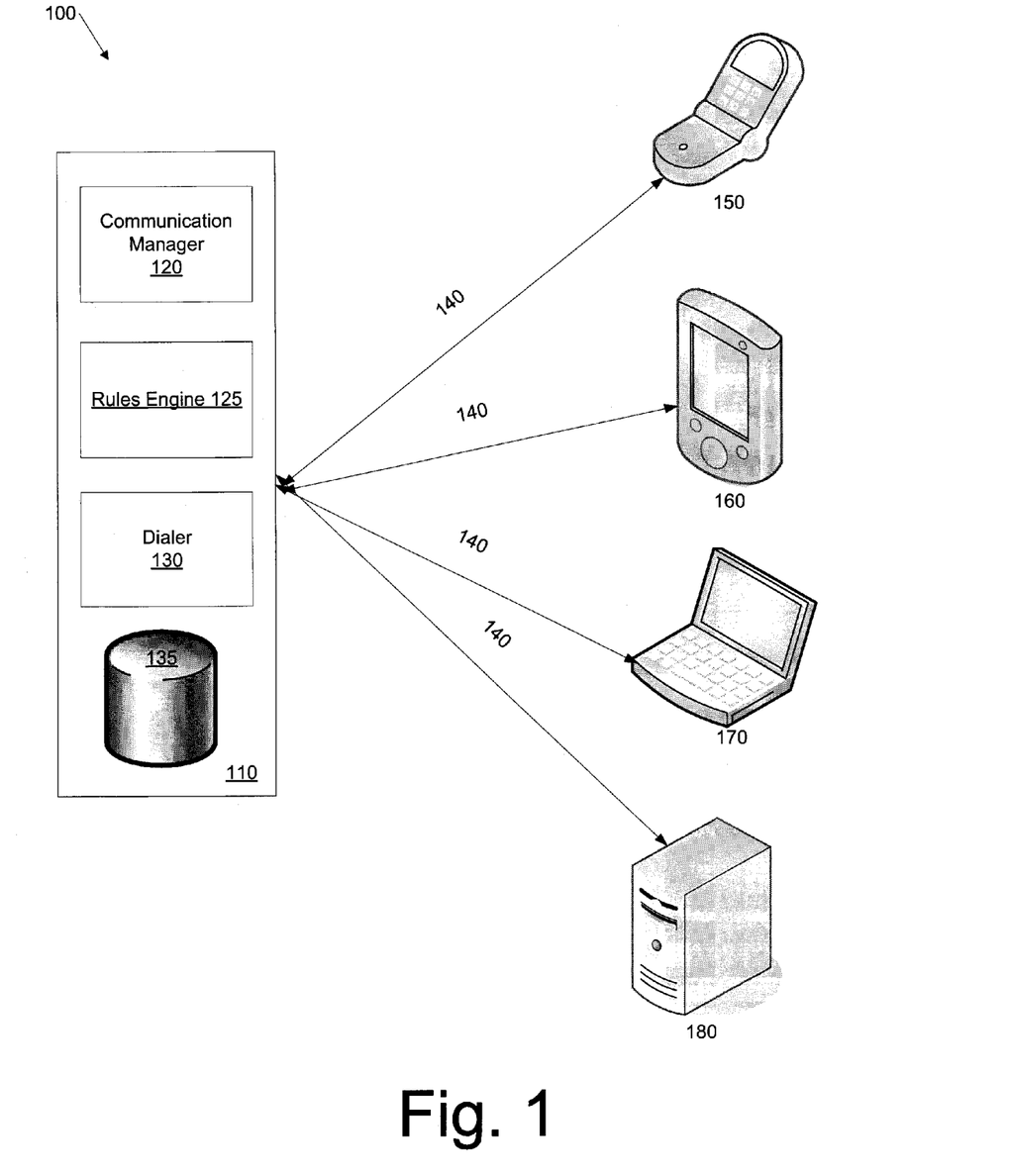
FIG. 1 is an illustration of a system for managing customer communications over communication channels according to one embodiment.
Figure 2:
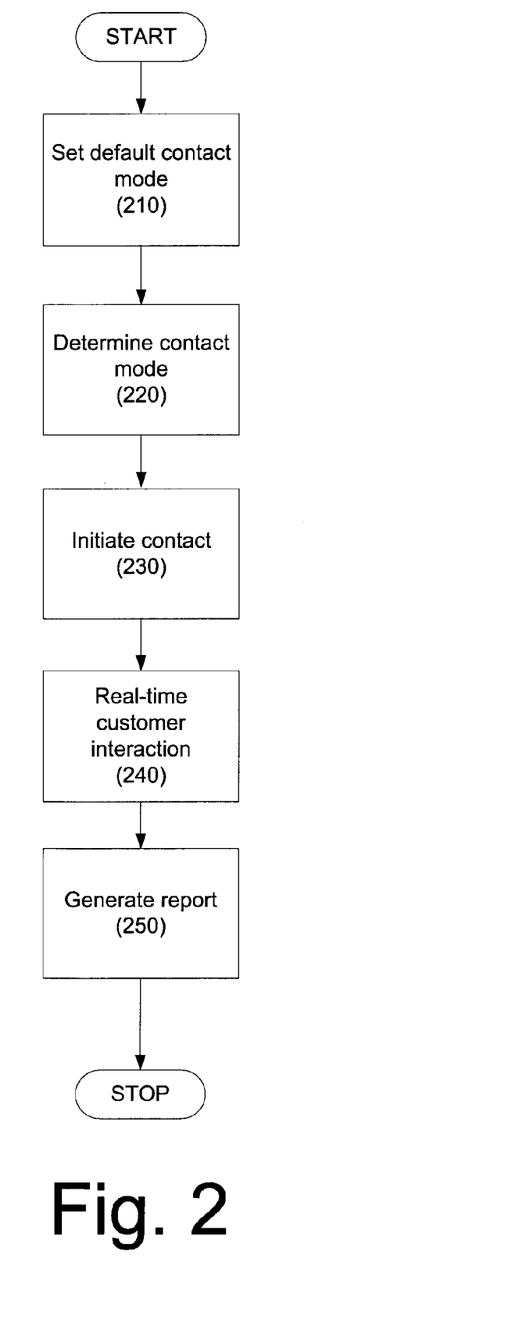
FIG. 2 is a flowchart depicting a method for managing customer communications over communication channels according to one embodiment.

Several embodiments of the present invention and their advantages may be understood by referring to FIGS. 1-2, wherein like reference numerals refer to like elements.

The following disclosures are related to the present invention: U.S. Pat. No. 5,621,790; U.S. patent application Ser. No. 11/763,030; and U.S. patent application Ser. No. 11/610,289. The disclosures of each is specifically incorporated by reference in its entirety.

According to one embodiment, a system and method for managing customer communications over communication channels is provided. In one embodiment, the system may include a communication manger that may provide an dialing mode called "preview manual mode." This mode may enable greater supervision over the preview mode, and may ensure compliance with any company, governmental, or other laws, regulations and/or policies. Unlike preview mode, preview manual mode may require human intervention, such as by an agent, to initiate an action to dial the initial phone numbers. In one embodiment, an automated countdown timer is not a suitable initiator.

In one embodiment, reports may be generated to show that each call that meets the criteria of preview manual mode has been made in this mode.

In one embodiment, the communication manager may also provide the ability to switch calling modes among predictive mode, preview mode, preview manual mode and full manual mode as necessary and/or desired. In one embodiment, the switch may be made based on customer account attributes, a phone number received in the dialer input file, customer real-time feedback, customer availability, etc.

In one embodiment, the decision to switch modes may be made at, for example, a campaign level, an account level, a phone number level, etc. The communication manager may be updated by dialer operators using a rules engine. Within the rules engine, the account level, phone number level and other criteria (such as time of day and campaign goals) for switching calling modes may be established.

In one embodiment, the dialer may return to a default dialer mode that is set at a campaign level when the criteria to switch modes no longer apply. For example, a campaign may start as a predictive mode default campaign. When an account balance reaches a certain threshold, an outbound attempt on that account may be switched to preview mode. Later in the campaign, when an account with a phone number that is a cell phone (without consent) is presented to the dialer for calling, the dialer may switch to a preview manual mode.

After each of these attempts, the dialer may revert to the default predictive dialing mode.

In another embodiment, the communication manager may also provide the ability to move accounts into other communication channels based on account and phone number attributes such as consent, campaign rules, customer preferences, etc. in real-time. The communication manager may have the ability to initiate a customer contact attempt through non-voice channels based on account-level attributes. For example, when an account has a text messaging preference indicator and text messaging consent indicator, then a text message would be sent to the customer.

In one embodiment, these attempts may be integrated within the auto dialer, or may be executed through an offload process with an external application. The offload may include, for example, an external vendor.

In another embodiment, the communication manager may also provide the ability to receive real-time feedback from customers on one contact channel to consent to trigger a calling mode decision or an alternate contact channel decision. The auto dialer may have the ability to receive real-time customer consent by contact channel and manage non-voice customer communication. The initial consent information by contact channel for the day may come in a field in the dialer file. Throughout the day, the customer may send more up-to-date consent information for different contact channels, or may initiate a two-way non-voice interaction. For example, throughout the day a customer may grant consent for a text message through an online customer service application. For consent updates, the communication manager may update the rest of the day's campaign based on this new information and send an update to the system of record. The communication manager may then initiate a text message if, for example, other campaign criteria are met.

The communication manager may also be used to manage the flow of information to and from the customer. For two-way non-voice customer communication, such as using a voice response unit (VRU), the communication manager may decide how to route the call to the most appropriate agent.

Referring to FIG. 1, a system for managing customer communications over communication channels according to one embodiment is provided. System 100 may include communications center 110, communication channels 140, and may include mobile phone 150, PDA 160, computer 170, and server 180.

In one embodiment, communications center 110 may include communication manager 120, rules engine 125, dialer 130, and database 135. In one embodiment, communication manager 120 may be an application executed by a computer processor. In another embodiment, communication manager 120 may include human interaction. Communications center 110 may further include one or more agents.

In one embodiment, rules engine 125 may be provided. Rules engine 125 may be provided as part of communications center 110, or it may be provided separately. Rules engine 125 may interact with communication manager 120 to implement business rules that may be stored in, for example, database 135.

As used herein, the terms "dialer" and "auto dialer" may include phone dialers, as well as any device that can initiate contact by email, text, video, letter, VRU, etc.

In one embodiment, database 135 may store data that may be used by campaign manager 120 and/or rules engine 125. In one embodiment, the data may include a campaign strategy, account attributes, phone number attributes, previous contact outcomes, previous call outcomes, email attributes, customer feedback through other communication channels, customer contact preferences, customer consent to be contacted by cellular phone, customer location (e.g., last known customer location, customer location history, etc.) text messages, etc. Although only one database 135 is illustrated, others may be provided as necessary and/or desired. In one embodiment, the data may be located on several databases.

In one embodiment, communication channels 140 may include any suitable communication channel, including, for example, plain old telephone service (POTS) lines (i.e., landlines), voice over IP (VoIP) networks, fiber optic networks, RF networks, IR networks, the Internet, Bluetooth networks, near-field communication networks, satellite communication networks, Wi-Fi networks, email, chat, text, video, fax, social networking sites, etc.

In FIG. 1, several communication devices, including mobile phone 150, PDA 160, and computer 170 are disclosed. Other communication devices, including landline telephones, eBook readers, etc., may be used as necessary and/or desired.

Server 180 may host a website, such as, for example, a social networking site, a blog, etc.

Referring to FIG. 2, a method for managing customer communications over communication channels is provided. In step 210, the method may set the contact mode to a default contact mode. In one embodiment, a contact mode may include the communication channel and the way by which the customer is contacted over that communication channel. For example, the selection of the default contact mode may include the selection of the default communication channel (e.g., voice based (e.g., landline phone, cellular phone), email, text, chat, etc.), and, if a voice-based communication channel is selected, the dialing mode. As another example, if an email communication channel is selected, the default format for the email (e.g., text, html) may be selected.

In one embodiment, this step may also include selecting a default dialing mode, such as predictive mode, preview mode, preview manual mode, and full manual mode (e.g., the agent dials the number with no assistance) for a voice-based communication channel. The default mode may be the mode that is least likely to create unauthorized call issues, such as by calling a cellular telephone without consent. In one embodiment, the default mode may be the preview manual mode. The default mode may be set based on, for example, a campaign strategy, company policy, etc.

In step 220, the contact mode to be used may be selected. In one embodiment this may involve selecting the communication channel and the mode of using that communication channel (e.g., dialing mode, etc.). In one embodiment, the contact mode may be selected based on a campaign strategy (e.g., intensity of campaign), account attributes (e.g., account status), phone number attributes (e.g., landline, cellular), previous contact outcomes (e.g., responses to emails, texts, etc.), previous call outcomes (e.g., repeated hang-ups in predictive mode), email attributes (e.g., a yahoo account versus a work account), time of day, customer feedback through other communication channels, customer contact preferences, customer consent to be contacted by cellular phone, text messages, etc.

In one embodiment, the communication manager may take the following into consideration when determining the mode and communication channel on which to attempt contact with the customer:

1. Account, phone number/communication channel triggers. For example, customers with outstanding balances may be contacted in preview mode only rather than the default predictive mode.

2. Call outcomes from previous call(s). The outcomes of previous calls may be used to determine the mode and/or communication channel used. For example, if a customer routinely hangs up on an auto-dialer during the connection break, the system will use preview mode. If the customer never answers the phone, the system may use a different mode of communication.

3. Campaign goals/list level intensity. The campaign may have certain goals, e.g., four phone attempts followed by an email if phone attempts are unsuccessful.

4. Time of day settings. The system may use a less-intrusive (e.g., email, text) during evening hours rather than contacting the customer by telephone or cell phone.

5. Immediate customer feedback. Customer preferences, such as a comment from a customer that he or she prefers contact by cell phone, prefers contact by email, etc. are considered. This feedback may come from an external source (e.g., when a customer contacts card customer service, this information is recorded in the customer's profile) and used in subsequent communication attempts.

6. Customer information mining: Information about a customer, such as the customer's location, may be determined based on information gathered from social networking sites (e.g., Facebook, Four Square, Twitter, etc.). For example, by mining a social networking cite, information submitted regarding a customer's location, data regarding the most recent updated submitted by the customer, etc. may be used. Similarly, location data may be determined if the customer provides, or enables, real-time (or close to real time) location information from its mobile device (e.g., Google Latitude), social networking sites, etc. This information may be used to determine if an attempt to contact a customer should be made at home, on a mobile device, on a different communication channel, etc.

In another embodiment, information about the customer's availability may be determined from social networking sites, Internet service providers, electronic mail providers, mobile phone providers, etc. Electronic mail providers, such as Yahoo!, often inform a user as to whether his or her contacts are on-line and/or available to receive instant messages, to chat, etc. Similarly, commercially-available software, for example, Lotus Sametime, Microsoft Office Communicator, etc. may retrieve information regarding the customer's presence, or availability, at a computer, such as a work computer, home computer, etc.

In another embodiment, information regarding a customer's cellular phone usage may be used. For example, information regarding the last time the customer used his or her cell phone, sent a text using the cell phone, etc. may be used.

In another embodiment, historical customer location data may be used to establish the likelihood that a customer is available on a particular communication channel. For example, during the workday, if a customer typically calls from a cellular telephone, while the customer typically calls from home in the evening, that data may be stored and used to assist in the determination of a communication channel based on the time of day. Automated number identification (ANI) may be used to determine the source of the call. Other customer location and availability trends may be used as necessary and/or desired.

Other factors may be considered as necessary and/or desired.

In one embodiment, the communication manager may make this determination.

In step 230, the dialer may initiate contact with the customer using the selected contact mode. This may involve, for example, manually dialing a telephone number, using an auto-dialer, generating an email, generating an instant message, generating a text, initiating chat, posting a message to a social networking site, sending letter by mail, sending an overnight delivery, etc.

In one embodiment, the communication manager may switch communication modes after contact has been initiated. This may be due to a customer request (e.g., the customer is contacted by phone and asks to be sent an email), due to a failure to establish contact with the customer, due to campaign strategy, due to an agent's decision, etc.

In step 240, the system may receive customer feedback based on interaction with the customer. In one embodiment, customer feedback may be provided on the same or on a different communication channel from the selected communication channel. For example, if a customer is contacted via landline, and prefers to be contacted by cellular phone, the customer may indicate such on a website, by sending a text message, etc. In another embodiment, the customer may periodically update his or her contact preferences on-line, by calling an agent, sending an email or text, etc.

In another embodiment, the customer may be requested to respond to a text message to give consent to be contacted on that number. For example, the CSA may send a message (e.g., SMS message) to the mobile device during the call, and the customer may respond by pressing "1" to give consent, "2" to decline, etc.

In another embodiment, each time the customer dials into a voice response unit, the customer may be asked to provide consent to be contacted on that phone number. The phone number may be captured by, for example, ANI systems, etc.

In another embodiment, the consent may be received by multi-channel authentication. For example, if the ANI system identifies a caller on a new device (e.g., a new phone number), the system may require authorization for that device to access account data. This may be achieved by sending a message to an already approved device, and verifying the customer's identity. For example, in one embodiment, the system may send a code to the approved device and request that the code be entered into the new device. At that time, consent to contact the customer on the new device may be requested.

In another embodiment, if the ANI system identifies a new device, the system may request consent to contact the customer on that device.

In another embodiment, the ANI system may inform the customer that by contacting the CSA on the device, the customer is opting into authorizing contact on that device. The customer may be able to opt out by pressing a key, sending a message, calling the agent, etc.

In another embodiment, the customer may provide consent when it accesses its account on-line. For example, the customer may be requested to provide consent periodically when he or she signs into the account.

In another embodiment, the customer may be asked for consent when the customer establishes the account.

In step 250, the system may generate a report of customer contact. This may be for general record keeping, to show adherence with any applicable laws and/or regulations, etc. For example, if a customer calls an agent on a cellular phone, the agent may request consent to contact the customer on that phone number. This consent may be recorded and stored by any appropriate method. In one embodiment, the audio may be digitized and stored, or associated, with account information. In another embodiment, the customer may be requested to send a message, such as a SMS, EMS, MMS message, etc. indicating consent.

An illustration of the use of the communication manager is provided. When a cellular phone number (without customer consent) is presented to the communication manager, the communication manager may switch a dialer to a preview manual mode before the call can be made. The preview manual mode may require the agent to initiate all calls by interacting with the dialer. In traditional preview mode, the dialer may execute the first call based on a countdown timer. With preview manual mode, in one embodiment, the initial dialer call may only be executed by an advisor taking action to initiate the call. The communication manager may require the dialer to switch back to other dialing modes after the preview manual mode call is completed.

In one embodiment, the requirement to call cell phones with an automated dialer only when consent has been given may also be applied to other contact channels such as text messages, automated voice response applications, e-mails, instant messaging, social networking, etc.

Examples of process controls that may be achieved are as follows:

1. Cell phones without customer consent cannot be called in any other mode than preview manual mode. This is an example of preventive control.

2. Reports will be created to show that every cell phone without consent in the dialer file has been called in preview manual mode. This is an example of detective control.

3. Reports will be created to show calls made in the other dialing modes met the criteria for those dialing modes based on account attributes. This is another example of detective control.

4. Reports will be created to show customer contact attempt by non-voice channels met the expected criteria for those attempts. This is another example of detective control.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically-distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, communications channel, a satellite transmission, memory card, SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialog screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method for managing customer communications over a plurality of communication channels comprising:
 at least one of a plurality of computer processors determining a communication channel for contacting a customer;
 at least one of the plurality of computer processors determining contact information for the customer to be used with the determined communication channel;
 presenting the contact information to an agent;
 receiving, at an electronic device, authorization to initiate contact with the customer using the contact information; and
 at least one of a plurality of computer processors automatically initiating contact with the customer using the communication channel, wherein the communication channel is determined based on a location of the customer.

2. The method of claim 1, wherein the communication channel comprises at least one of a wired phone line and a cellular phone.

3. The method of claim 2, further comprising:
 determining a dialing mode for the wired phone line or the cellular phone, wherein the dialing mode is one of a predictive mode, a preview mode, a preview manual mode, and a manual mode.

4. The method of claim 2, further comprising:
 determining a dialing mode for the wired phone line or the cellular phone, wherein the dialing mode is the preview manual mode.

5. The method of claim 2, wherein the step of determining a communication channel for contacting a customer comprises:
 determining whether the customer has consented to being contacted on the customer's cellular phone; and
 determining that the communication channel is other than the customer's cellular phone if the customer has not given consent.

6. The method of claim 5, wherein determining whether the customer has consented to being contacted on the customer's cellular phone comprises checking a database for customer consent.

7. The method of claim 2, wherein the step of determining a communication channel for contacting a customer comprises:
 determining whether the customer has consented to being contacted on the customer's cellular phone; and
 determining that the communication channel is the customer's cellular phone if the customer has given consent.

8. The method of claim 7, wherein determining whether the customer has consented to being contacted on the customer's cellular phone comprises checking a database for customer consent.

9. The method of claim 1, wherein the communication channel comprises at least one of an email, a text message, a chat, a facsimile, and a social networking site.

10. The method of claim 1, wherein the communication channel is determined based on campaign strategy.

11. The method of claim 1, further comprising:
 using at least one of the plurality of computer processors, determining an alternate communication channel by which to contact the customer; and
 initiating contact with the customer on the alternate communication channel.

12. The method of claim 8, wherein the alternate communication channel is determined based on one of a customer feedback, a customer availability and a customer preference.

13. The method of claim 1, wherein the wired phone line comprises one of a landline and a VOIP line.

14. The method of claim 1, wherein the communication channel comprises social media, and the step of automatically initiating contact with the customer using the communication channel comprises posting a communication on a social media website associated with the customer.

15. The method of claim 1, wherein the communication channel comprises electronic chat, and the step of automatically initiating contact with the customer using the communication channel comprises inviting the customer to an electronic chat session.

16. A system for managing customer communications over a plurality of communication channels comprising:
 a database comprising contact data for a plurality of customers, the database including at least one of a customer wired phone number, a customer cellular telephone number, a customer email address, and a customer text message address;
 a computer processor executing a communication manager, the communication manager determining a communication channel for contacting a customer selected from the group consisting of a wired phone, a cellular phone, an email, and a text message;
 wherein the communication manager retrieves, from the database, the contact data for the customer to be used with the determined communication channel;
 wherein the communication manager presents the contact data to an agent and receives authorization to contact the customer; and
 wherein the communication manager automatically initiates contact with the customer using the selected communication channel after receiving the authorization, wherein the communication channel is determined based on a location of the customer.

17. The system of claim 16, wherein the communication manager further determines a dialing mode for a wired phone communication channel and a cellular phone communication channel.

18. The system of claim 17, wherein the dialing mode is one of a predictive mode, a preview mode, a preview manual mode, and a manual mode.

19. The system of claim 17, wherein the dialing mode is preview manual mode.

20. The system of claim 19, wherein the database further comprises customer consent data; and
   wherein the communication manager further determines the communication channel for contacting a customer based on the customer consent data.

21. The system of claim 20, wherein the determined communication channel is other than the customer's cellular phone if the customer consent data does not indicate that the customer has given consent to be contacted on the customer's cellular phone.

22. The system of claim 20, wherein the determined communication channel is the customer's cellular phone if the customer consent data indicates that the customer has given consent to be contacted on the customer's cellular phone.

23. The system of claim 17, wherein the dialing mode is determined based on at least one of a campaign strategy, an account attribute, a phone number attribute, a previous call outcome, a customer preference, a customer availability, and a customer contact consent.

24. The system of claim 16, wherein communication manager further determines an alternate communication channel by which to contact the customer.

25. The system of claim 16, wherein the wired phone comprises one of a landline and a VOIP.

* * * * *